United States Patent
Otsuka et al.

(10) Patent No.: US 11,972,910 B2
(45) Date of Patent: Apr. 30, 2024

(54) ELECTROLYTIC CAPACITOR AND MANUFACTURING METHOD THEREFOR

(71) Applicant: Panasonic Intellectual Property Management Co., Ltd., Osaka (JP)

(72) Inventors: Yuji Otsuka, Yamaguchi (JP); Masahiro Aburaya, Yamaguchi (JP); Tatsuji Aoyama, Kyoto (JP); Tomoyuki Tashiro, Yamaguchi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/046,913

(22) Filed: Oct. 15, 2022

(65) Prior Publication Data

US 2023/0137973 A1    May 4, 2023

(30) Foreign Application Priority Data

Oct. 29, 2021  (JP) ................. 2021-178212

(51) Int. Cl.
*H01G 9/048*  (2006.01)
*H01G 9/008*  (2006.01)
*H01G 9/15*   (2006.01)

(52) U.S. Cl.
CPC ............. *H01G 9/048* (2013.01); *H01G 9/008* (2013.01); *H01G 9/151* (2013.01)

(58) Field of Classification Search
None
See application file for complete search history.

(56) References Cited

U.S. PATENT DOCUMENTS 5,194,127 A * 3/1993 Endoh ............... C25F 3/04
                                             216/87
2003/0039093 A1* 2/2003 Tadanobu ........... H01G 9/26
                                             29/25.03

(Continued)

FOREIGN PATENT DOCUMENTS

JP   2003-282364   10/2003
JP   2010-239059   10/2010

(Continued)

*Primary Examiner* — Eric W Thomas
(74) *Attorney, Agent, or Firm* — Rimon P.C.

(57) ABSTRACT

An electrolytic capacitor includes an electrode foil and a lead member connected to the electrode foil. The electrode foil has a first principal surface and a second principal surface opposite to the first principal surface. The electrode foil and the lead member are connected by a caulking part in an overlapping part in which the first principal surface of the electrode foil and the lead member overlap each other. The caulking part has a through-hole penetrating the electrode foil and the lead member. The electrode foil in the caulking part includes a first folded part that is folded back at a peripheral edge portion of the through-hole to be disposed on the second principal surface. The lead member in the caulking part includes (i) a penetrating part that penetrates the electrode foil and (ii) a second folded part that is folded back at an end portion of the penetrating part to be disposed on the second principal surface. The penetrating part includes an inner wall of the through-hole. The second folded part covers the first folded part.

6 Claims, 6 Drawing Sheets

(56) References Cited

U.S. PATENT DOCUMENTS

2005/0018383 A1* 1/2005 Ebel .................. H01G 9/022
　　　　　　　　　　　　　　　　　　　　361/503
2019/0371531 A1* 12/2019 Fukushima .......... H01G 9/0029

FOREIGN PATENT DOCUMENTS

| JP | 2012169575 A | * | 9/2012 | ............. H01G 9/008 |
| JP | 2021-097163 | | 6/2021 | |
| JP | 2021163857 A | * | 10/2021 | ........... H01G 9/0036 |
| WO | WO-2020050198 A1 | * | 3/2020 | ........... H01G 9/0029 |

* cited by examiner

ELECTROLYTIC CAPACITOR AND MANUFACTURING METHOD THEREFOR

BACKGROUND

1. Technical Field

The present disclosure relates to an electrolytic capacitor and a method for manufacturing an electrolytic capacitor.

2. Description of the Related Art

An electrolytic capacitor includes an electrode foil that a first principal surface and a second principal surface opposite to the first principal surface, and a lead member that is connected to the electrode foil. The electrode foil and the lead member are connected by steps (a) and (b). In step (a), the lead member is overlapped on the first principal surface of the electrode foil, and a predetermined position of an overlapping part is drilled from the lead member side by using a needle-shaped member to form a through-hole. In step (b), a portion of the lead member is led out from a peripheral edge portion of the through-hole above the second principal surface of the electrode foil by drilling, and then folded back onto the second principal surface and tightened.

Unexamined Japanese Patent Publication No. 2021-97163 proposes an electrolytic capacitor that includes a pair of electrode bodies connected to a lead-out terminal and an electrolyte interposed between the electrode bodies. In the electrolytic capacitor, one or both of the electrode bodies are graphite exposed electrode bodies and have a carbon layer containing graphite exposed on an outer surface. The lead-out terminal and the graphite exposed electrode body have a stitch connection structure, and the stitch connection structure has a through-hole penetrating the graphite exposed electrode body, a burr generated only in the lead-out terminal and led out from the through-hole to a back side surface of the graphite exposed electrode body, and a folded part of the burr folded back onto the back surface side of the graphite exposed electrode body.

SUMMARY

An electrolytic capacitor according to one aspect of the present disclosure includes an electrode foil and a lead member connected to the electrode foil. The electrode foil has a first principal surface and a second principal surface opposite to the first principal surface. The electrode foil and the lead member are connected by a caulking part in an overlapping part in which the first principal surface of the electrode foil and the lead member overlap each other. The caulking part has a through-hole penetrating the electrode foil and the lead member. The electrode foil in the caulking part includes a first folded part that is folded back at a peripheral edge portion of the through-hole to be disposed on the second principal surface. The lead member in the caulking part includes (i) a penetrating part that penetrates the electrode foil and (ii) a second folded part that is folded back at an end portion of the penetrating part to be disposed on the second principal surface. The penetrating part includes an inner wall of the through-hole. The second folded part covers the first folded part.

A method for manufacturing an electrolytic capacitor according to another aspect of the present disclosure includes a first step of preparing an electrode foil and a lead member, the electrode foil having a first principal surface and a second principal surface opposite to the first principal surface, and a second step of connecting the electrode foil and the lead member. The second step includes a second A step, a second B step, and a second C step to be described below. In the second A step, a preliminary through-hole is formed in the electrode foil and then the lead member is overlapped in a predetermined region of the electrode foil that includes the preliminary through-hole in the first principal surface. In the second B step, after the second A step, a hole is formed by piercing a needle-shaped member in a position of the lead member corresponding to the preliminary through-hole from a surface of the lead member to lead out a peripheral edge portion of the hole of the lead member above the second principal surface of the electrode foil. And then the needle-shaped member is allowed to pass through the preliminary through-hole to push and widen the preliminary through-hole so that a peripheral edge portion of the preliminary through-hole of the electrode foil protrudes from the second principal surface of the electrode foil. In the second C step, portion P1 of the electrode foil and a portion P2 of the lead member onto the second principal surface to tighten a folded part of the portion P1 and a folded part of the portion P2 to the second principal surface. The portion P1 protrudes from the second principal surface of the electrode foil, The portion P2 is led out above the second principal surface. In the second B step, diameter D1 of the preliminary through-hole is smaller than a diameter D2 of the needle-shaped member. The diameter D1 corresponds to the diameter D2 of the needle-shaped member when the needle-shaped member is allowed to pass through the preliminary through-hole. In the second C step, portion P2 is folded back to cover the folded part of portion P1 on the second principal surface.

According to the present disclosure, the electrolytic capacitor, contact resistance between the lead member and the electrode foil can be reduced.

DETAILED DESCRIPTIONS OF EMBODIMENTS

In an electrolytic capacitor, it is required to reduce contact resistance between a lead member and an electrode foil.

[Electrolytic Capacitor]

An electrolytic capacitor according to an exemplary embodiment of the present disclosure includes an electrode foil that has a first principal surface and a second principal surface opposite to the first principal surface, and a lead member that is connected to the electrode foil. The electrode foil and the lead member are connected by a caulking part in an overlapping part in which the first principal surface of the electrode foil and the lead member overlap each other.

The caulking part has a through-hole penetrating the electrode foil and the lead member. The electrode foil in the caulking part includes a first folded part that is folded back at a peripheral edge portion of the through-hole to be disposed on the second principal surface. The lead member in the caulking part includes (i) a penetrating part that penetrates the electrode foil and (ii) a second folded part that is folded back at an end portion of the penetrating part to be disposed on the second principal surface. The penetrating part includes an inner wall of the through-hole. The second folded part covers the first folded part.

Note that "the second folded part covers the first folded part" means that the following conditions (i) and (ii) are satisfied.

Condition (i): When the caulking part is viewed from a normal direction of the second principal surface of the electrode foil, area S1 of a region where the second folded part covers the first folded part is smaller than area S2 of the second folded part.

Condition (ii): When the caulking part is viewed from the normal direction of the second principal surface of the electrode foil, area S3$a$ of a region where the first folded part is covered with the second folded part is larger than area S3$b$ of a region where the first folded part is not covered with the second folded part, or the entire first folded part is covered with the second folded part.

A ratio S1/S2 of area S1 to area S2 may be, for example, greater than or equal to 1/3 (or greater than or equal to 1/2) and less than 1, may be greater than or equal to 1/3 (or greater than or equal to 1/2) and less than or equal to 9/10, may be greater than or equal to 1/3 (or greater than or equal to 1/2) and less than or equal to 4/5.

When the second folded part is constituted by a plurality of caulking pieces which are formed to be separated with each other, 1/2 or more of the plurality of caulking pieces may satisfy S1/S2<1, and 3/4 or more (or all) of the plurality of caulking pieces preferably satisfy S1/S2<1.

Figure 3:
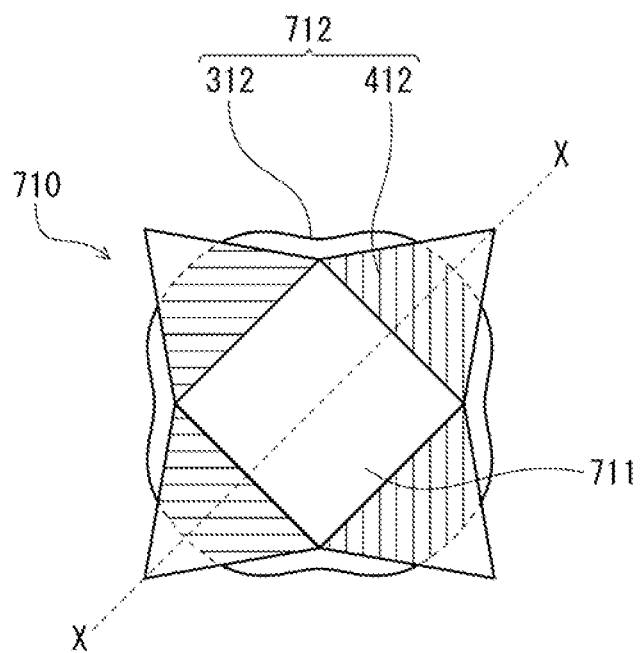
FIG. 3 is an enlarged front view illustrating a first caulking part in FIG. 2.

In the case of caulking part 710 illustrated in FIG. 3, second folded part 412 is constituted by four caulking pieces (four triangular portions) which are separated with each other. And each of the four caulking pieces has a region (four hatched portions in FIG. 3) which covers first folded part 312. In this case, area S2 in the above condition (i) is an area of one caulking piece (one triangular portion). And area S1 is an area of one hatched portion in one caulking piece. In caulking part 710 illustrated in FIG. 3, S1/S2<1 is satisfied in all the four caulking pieces.

A ratio S3$b$/S3$a$ of area S3$b$ to area S3$a$ may range, for example, from 0 to 1/3 (or to 1/2), inclusive, or from 0 to 1/4, inclusive.

In the case of the caulking part 710 illustrated in FIG. 3, area S3$a$ of the above condition (ii) is an area of a region where first folded part 312 is covered with second folded part 412 (four caulking pieces) (an area obtained by adding four hatched portions in FIG. 3). And area S3$b$ is a value obtained by subtracting area S3$a$ from the entire area of first folded part 312. In caulking part 710 illustrated in FIG. 3, S3$b$/S3$a$<1 is satisfied.

The caulking part that includes the first folded part and the second folded part is formed by a manufacturing method to be described later. When the second folded part is formed to cover the first folded part, the first folded part is pressed together with the second folded part in a state of being wrapped by the second folded part on the second principal surface when the caulking part is formed (when the overlapping part is pressed). Thus, the first folded part and the second folded part firmly adhere to each other, and a region where the first folded part and the second folded part adhere to each other is also sufficiently secured. As a result, contact resistance between the lead member and the electrode foil is reduced. Connection strength between the lead member and the electrode foil is increased, and even when a load is applied to the connecting part (caulking part) between the lead member and the electrode foil, low contact resistance can be maintained.

When the second folded part does not cover the first folded part, the first folded part is less likely to be fixed by the second folded part during pressing, and is easily deviated in a direction protruding from the second folded part on the second principal surface. Thus, adhesiveness between the first folded part and the second folded part is not sufficiently secured, and the region where the first folded part and the second folded part adhere to each other is also reduced.

The electrode foil includes a metal foil containing a first metal. The first metal includes a valve metal such as aluminum, tantalum, or niobium. The metal foil may be a plain foil or a metal foil whose surface is roughened by an etching treatment or the like.

The metal foil whose surface is roughened includes a porous part and a core part continuous with the porous part. A thickness of the porous part (thickness per one surface) ranges, for example, from 1/10 to 3/10, inclusive, of a total thickness of the metal foil. The porous part has a large number of pits (or pores) surrounded by the metal portion. A peak of a pit diameter (or pore diameter) ranges, for example, from 50 nm to 2000 nm, inclusive, (or from 100 nm to 300 nm, inclusive). The peak of the pit diameter (or pore diameter) is a most frequent pore diameter of a volume-based pore diameter distribution measured by, for example, a mercury porosimeter.

The surface of the metal foil is usually covered with a natural oxide film or a coating layer to be described later. When the caulking part is formed by a manufacturing method to be described later by using the electrode foil in which the surface of the metal foil is covered with the coating layer (or the natural oxide film), the first folded part may have a region not covered with the coating layer (or the natural oxide film), that is, a region (region C to be described later) where a metal base of the electrode foil is exposed on the surface covered with the second folded part. Even when the conductivity of the coating layer is low, the contact resistance between the lead member and the electrode foil can be reduced due to the presence of region C. The metal base of the electrode foil can also be said to be a metal structure of the metal foil. However, when the electrode foil is a metal foil whose surface is roughened, the metal base of the electrode foil means a metal structure of the core part of the metal foil.

When the second folded part does not cover the first folded part, region C is likely to be covered with an end portion of the second folded part, and adhesiveness between region C and the second folded part may be low. Alternatively, region C may be exposed from the second folded part.

The electrode foil may include a metal foil and a coating layer covering a surface of the metal foil. The coating layer is formed, for example, for the purpose of improving corrosion resistance of a cathode foil, improving conductivity of the cathode foil, and the like. In this case, the coating layer may include at least one selected from the group consisting of a metal oxide layer, a metal nitride layer, a metal carbide layer, and a conductive layer. The coating layer may contain a second metal. Examples of the second metal include titanium, nickel, tantalum, and niobium. The coating layer may contain two or more kinds of second metals. The second metal may be the same as or different from the first metal. The coating layer may contain carbon, and the conductive layer may be a carbon layer. When the surface of the metal foil is roughened, the electrode foil may include a coating layer covering a metal skeleton constituting the porous part.

When the electrode foil is used as the cathode foil, a thickness of the electrode foil ranges, for example, from 20 μm to 60 μm, inclusive, and a thickness of the coating layer ranges, for example, from 0.1 μm to 5 μm, inclusive. In the case of the metal foil whose surface is roughened, the thickness of the coating layer refers to a thickness of the coating layer covering an outer surface of the porous part.

The electrode foil may include a metal foil having a porous part and a core part continuous with the porous part, and a metal oxide layer covering a metal skeleton constituting the porous part. In this case, the electrode foil can be used as an anode foil. The metal oxide layer may function as a dielectric layer. The metal oxide layer may be an anodization coating film (first metal oxide layer) formed by an anodizing treatment.

In a cross section of the caulking part in a plane parallel to a thickness direction of the electrode foil, length L1 from a center of the through-hole to an edge of the first folded part in a plane direction of the electrode foil is preferably smaller than length L2 from the center of the through-hole to an edge of the second folded part in the plane direction of the electrode foil. L1/L2 may be less than or equal to 0.9, and may be less than or equal to 0.8. L1/L2 is preferably greater than ½ times diameter D2 of the needle-shaped member to be described later, and may be greater than or equal to 0.4 or greater than or equal to 0.5. L1/L2 may be in a range (for example, more than D/2 and less than 1) obtained by arbitrarily combining the above upper limit and lower limit. When L1/L2 is within the above range, the first folded part (region C) is easily covered with the second folded part, and good adhesiveness between the first folded part and the second folded part is easily secured.

The "edge of the second folded part" is point P of the second folded part farthest from the center of the through-hole. L2 is a shortest distance from the center to point P. The "edge of the first folded part" is point Q of the first folded part farthest from the center of the through-hole in the cross section including point P of the caulking part (cross section of the electrode foil in a plane parallel to the thickness direction). L1 is a shortest distance from the center to point Q. When the second folded part is constituted by a plurality of caulking pieces which are separated with each other, a relationship of L1<L2 may be satisfied in at least one caulking piece, and the relationship of L1<L2 is preferably satisfied in ½ or more (or all) of the plurality of caulking pieces. In a case that a shape of the through-hole is a regular polygon when the caulking part is viewed from the normal direction of one principal surface of the electrode foil, the center of the through-hole coincides with the center of a circumscribed circle of the regular polygon.

Figure 1:
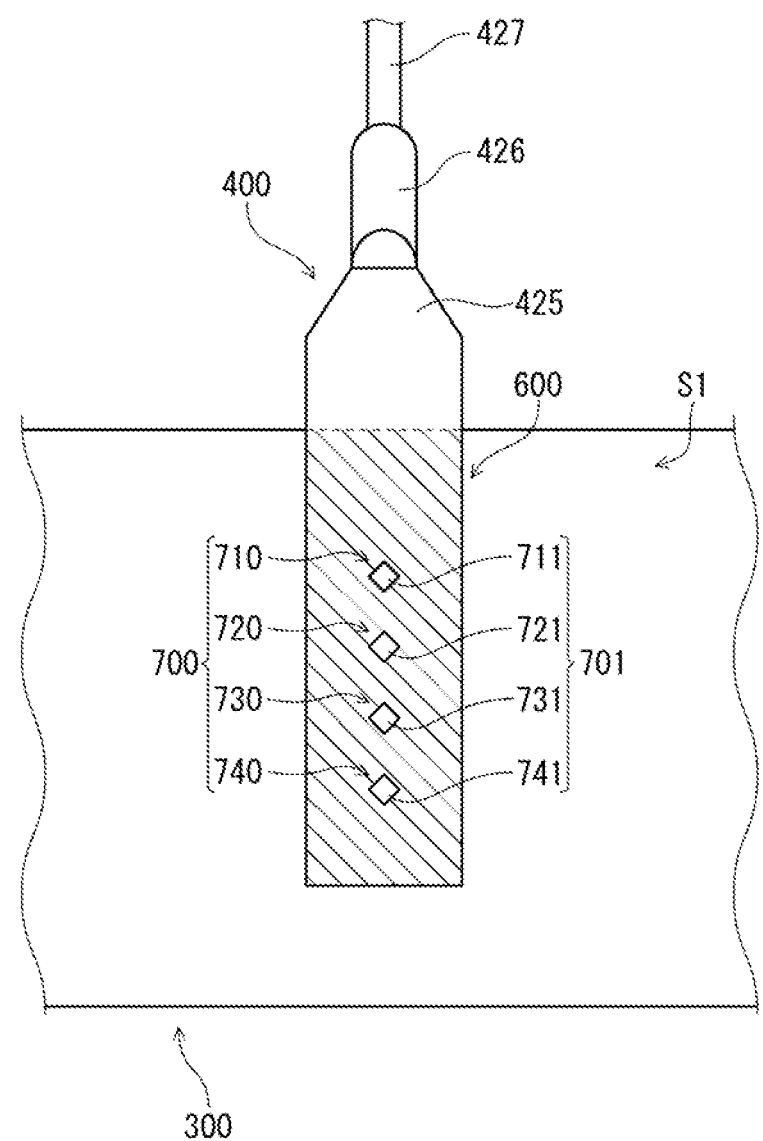
FIG. 1 is a front view illustrating main parts of an electrode foil and a lead member in an electrolytic capacitor according to an exemplary embodiment of the present disclosure as viewed from a lead member side.
Figure 2:
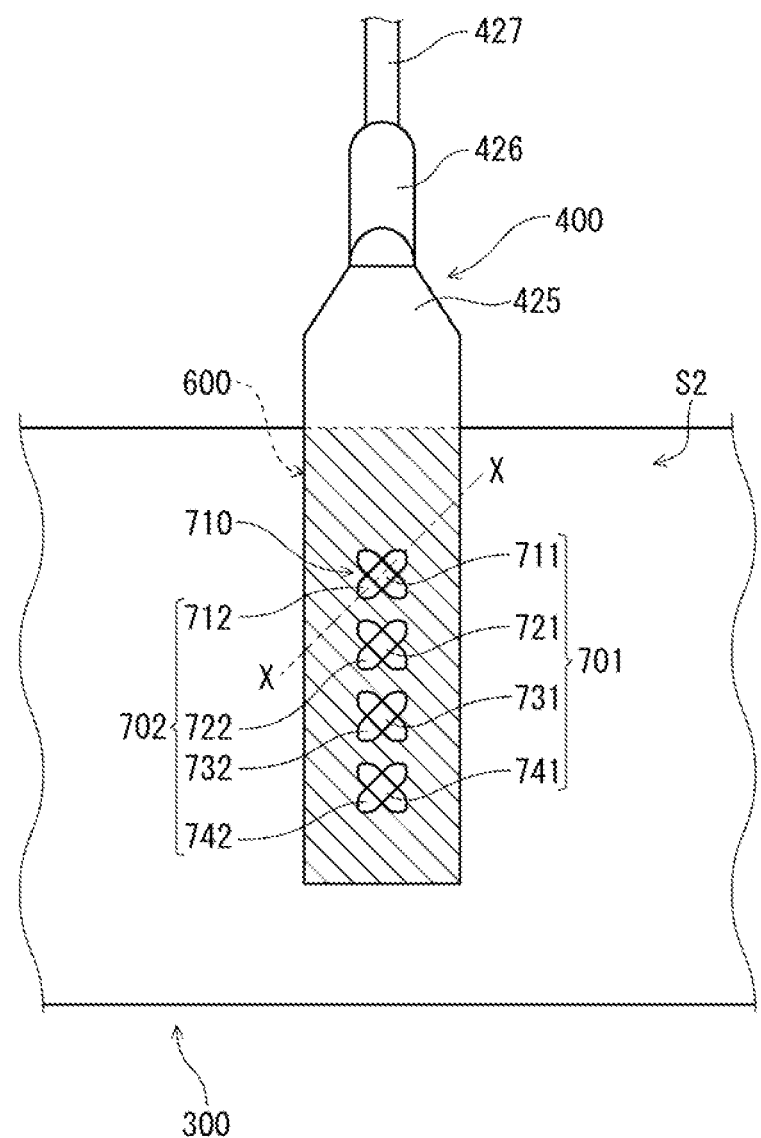
FIG. 2 is a front view illustrating main parts of the electrode foil and the lead member in the electrolytic capacitor according to the exemplary embodiment of the present disclosure as viewed from an electrode foil side.

FIG. 1 is a front view illustrating main parts of an electrode foil and a lead member in an electrolytic capacitor according to an exemplary embodiment of the present disclosure as viewed from a lead member side. In FIG. 1, overlapping part 600 is viewed from lead member 400 side (first principal surface S1 side of electrode foil 300). FIG. 2 is a front view illustrating main parts of the electrode foil and the lead member in the electrolytic capacitor according to the exemplary embodiment of the present disclosure as viewed from an electrode foil side. In FIG. 2, overlapping part 600 is viewed from electrode foil 300 side (second principal surface S2 side). In FIGS. 1 and 2, overlapping part 600 is hatched for the sake of convenience.

Electrode foil 300 has first principal surface S1 and second principal surface S2 opposite to first principal surface S1. Electrode foil 300 includes metal foil 301, first coating layer 302a (on first principal surface S1 side) that covers one principal surface of metal foil 301, and second coating layer 302b (on second principal surface S2 side) that covers the other principal surface of metal foil 301. Metal foil 301 is a plain foil, and coating layers 302a and 302b are formed on both surfaces of the plain foil. The metal foil is not limited thereto, and may be a metal foil whose surface is roughened. The metal foil may include a first porous part on first principal surface S1 side, a second porous part on second principal surface S2 side, and a core part continuous with the first porous part and the second porous part.

Lead member 400 includes lead wire 427, flat tab part 425, and lead wire connecting part 426 to which lead wire 427 is connected. Lead member 400 is not particularly limited as long as the lead member is a conductive member having tab part 425, lead wire connecting part 426, and lead wire 427, and for example, can be prepared as follows. A metal bar-shaped member is prepared, and one end thereof is extended flat by pressing or the like to form tab part 425. The other end is remained in the bar shape to form lead wire connecting part 426.

Lead wire connecting part 426 and lead wire 427 are connected by welding or the like.

Overlapping part 600 is formed by overlapping electrode foil 300 and tab part 425. Electrode foil 300 and tab part 425 of lead member 400 are connected to each other by four caulking parts 700 (first caulking part 710, second caulking part 720, third caulking part 730, and fourth caulking part 740) in overlapping part 600. Four caulking parts 700 are each formed by a manufacturing method to be described later.

Each of the plurality of caulking parts 700 has one through-hole 701 (first through-hole 711, second through-hole 721, third through-hole 731, or fourth through-hole 741) penetrating electrode foil 300 and lead member 400. Although an inner wall of each through-hole 701 is mainly formed by lead member 400 partially led out to second principal surface S2 of electrode foil 300, a part of the inner wall may be formed by exposing electrode foil 300. Lead member 400 forms the inner wall of through-hole 701, and has a penetrating part penetrating electrode foil 300 from first principal surface S1 to second principal surface S2. When caulking part 700 is viewed from a normal direction of one principal surface of electrode foil 300, a region where neither lead member 400 nor electrode foil 300 is present is through-hole 701. An outer periphery of through-hole 701 is an annular line formed by projecting through-hole 701 onto one principal surface of the electrode foil.

Each of the plurality of caulking parts 700 has one caulking piece 702 (first caulking piece 712, second caulking piece 722, third caulking piece 732, or fourth caulking piece 742) formed in a peripheral edge portion of one through-hole 701 (first through-hole 711, second through-hole 721, third through-hole 731, or fourth through-hole 741).

Figure 4:
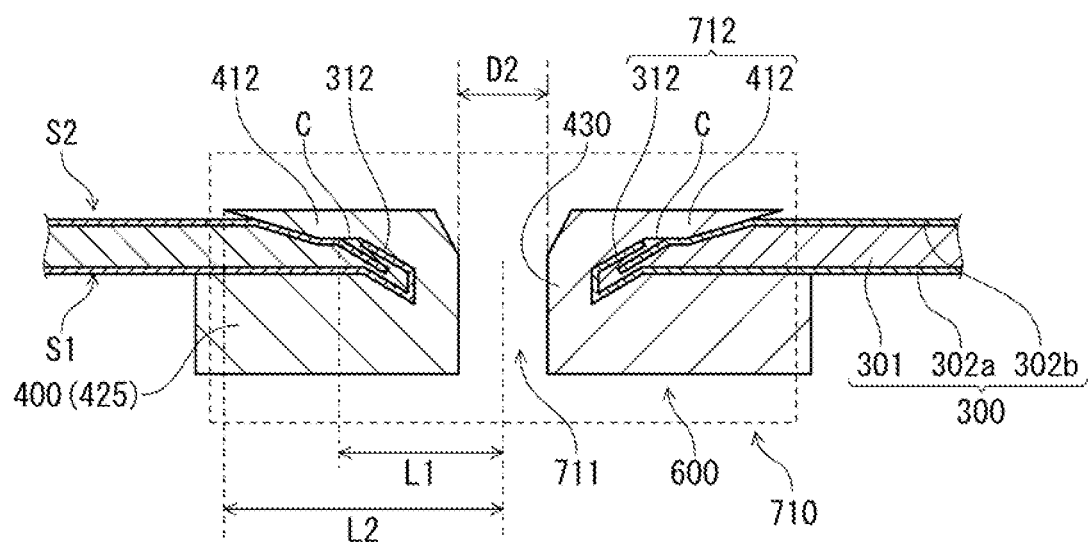
FIG. 4 is a sectional view taken along line X-X of FIG. 2.

Here, FIG. 3 is an enlarged front view of first caulking part 710 of FIG. 2. FIG. 4 is a sectional view taken along line X-X in FIG. 2, and illustrates a cross section in which a length (corresponding to lengths L1 and L2 to be described later) of caulking piece 712 (folded parts 312 and 412) wraparound toward second principal surface S2 side becomes maximum. FIG. 4 is a sectional view schematically illustrating first caulking part 710. Second caulking part 720 to fourth caulking part 740 have the same configuration as the configuration of first caulking part 710, and the description thereof will be omitted.

In first caulking part 710, electrode foil 300 has first folded part 312 that is folded back at the peripheral edge portion of first through-hole 711 to be disposed on second principal surface S2. Lead member 400 includes penetrating part 430 that constitutes the inner wall of through-hole 711 and penetrates electrode foil 300, and second folded part 412 that is folded back at an end portion of penetrating part 430 to be disposed on second principal surface S2. Second folded part 412 covers first folded part 312 on second principal surface S2 side. First caulking piece 712 is constituted by caulking pieces of first folded part 312 and second folded part 412. Second folded part 412 is constituted by four caulking pieces (triangular portions in FIG. 3) which are formed to be separated with each other. First folded part 312 is constituted by one caulking piece. Meanwhile, first folded part 312 may be constituted by a plurality of (for example, four) caulking pieces which are formed to be separated with each other. Lead member 400 (penetrating part 430) forms the inner wall of first through-hole 711. A surface of first folded part 312 which is covered with second folded part 412 has region C where a metal structure of metal foil 301 is exposed. Region C is present near an edge of first folded part 312.

In a cross section of first caulking part 710 in a plane parallel to a thickness direction of electrode foil 300 illustrated in FIG. 4 (cross section taken along line X-X in FIG. 2), a length from a center of first through-hole 711 to an edge of first folded part 312 in a plane direction of electrode foil 300 is defined as L1. A length from the center of first through-hole 711 to an edge of second folded part 412 in the plane direction of electrode foil 300 is defined as L2. At this time, L1/L2 is preferably within the above range. In this case, the first folded part is easily covered with the second folded part, and good adhesiveness between the first folded part and the second folded part is easily secured.

A sectional shape of caulking piece 712 varies depending on which cross section of caulking piece 712 is viewed. The same applies to sectional shapes of the other caulking pieces. FIG. 4 is a cross section taken along line X-X in FIG. 2, and illustrates a cross section in which a length of caulking piece 712 (folded parts 312 and 412) wraparound toward second principal surface S2 side becomes maximum.

Although FIGS. 1 and 2 illustrate an example in which four through-holes 701 are arranged in a line in a width direction of electrode foil 300, the arrangement of the through-holes is not limited thereto. From the viewpoint of securing the caulking part and connection strength, for example, the four through-holes may be provided to be spaced apart by 0.5 mm or more, or may be provided to be spaced apart by 0.5 mm or more and 3.0 mm or less.

Although the number of caulking parts 700 (through-holes 701) formed in the overlapping part in FIGS. 1 and 2 is four, the number of caulking parts (through-holes) is not limited thereto, and is usually greater than or equal to 2. For example, the number of caulking parts ranges preferably from 2 to 4 (or from 3 to 4) from the viewpoint of contact resistance and connection strength.

Although a size of through-hole 701 is not particularly limited, a maximum diameter ranges preferably from 0.5 mm to 1.2 mm, inclusive (or from 0.7 mm to 1 mm, inclusive). When the maximum diameter of the through-hole is greater than or equal to 0.5 mm, electrical connection is easily reliable. When the maximum diameter of the through-hole is less than or equal to 1.2 mm, mechanical strength of the lead member and the electrode foil is easily maintained. The sizes of the plurality of through-holes may be different from each other.

Although some of the four caulking parts may have a structure other than the structure illustrated in FIG. 4, it is preferable that any of the caulking parts has the structure illustrated in FIG. 4 from the viewpoint of reducing the contact resistance between the electrode foil and the lead member.

[Method for Manufacturing Electrolytic Capacitor]

A method for manufacturing an electrolytic capacitor according to an exemplary embodiment of the present disclosure includes a first step of preparing a lead member and an electrode foil having a first principal surface and a second principal surface opposite to the first principal surface, and a second step of connecting the electrode foil and the lead member. The second step includes a second A step to a second C step.

In the second A step, a preliminary through-hole is formed in the electrode foil and then the lead member is overlapped in a predetermined region of the electrode foil which includes the preliminary through-hole in the first principal surface.

In the second B step, a hole is formed by piercing a needle-shaped member in a position of the lead member corresponding to the preliminary through-hole from the lead member side to lead out a peripheral edge portion of the hole of the lead member above the second principal surface of the electrode foil (that is, the peripheral edge portion of the hole of the lead member is allowed to penetrate through the electrode foil to be led out from the first principal surface side of the electrode foil to the second principal surface). And then the needle-shaped member is allowed to pass through the preliminary through-hole to push and widen the preliminary through-hole so that a peripheral edge portion of the preliminary through-hole of the electrode foil protrudes from the second principal surface of the electrode foil.

In the second B step, diameter D1 of the preliminary through-hole is smaller than diameter D2 of the needle-shaped member. Here, the diameter D1 of the preliminary through-hole corresponds to diameter D2 of the needle-shaped member when the needle-shaped member is allowed to pass through the preliminary through-hole. When D1/D2<1 is satisfied, the protrusion is easily formed together with the led part. A protrusion having region B to be described later can be formed. D1/D2 may be less than or equal to 0.9, and may be less than or equal to 0.8. In the second B step, the needle-shaped member is allowed to pass through the preliminary through-hole such that the diameter indicating diameter D2 of the needle-shaped member coincides with the diameter indicating diameter D1 of the preliminary through-hole when viewed from the normal direction of the first principal surface of the electrode foil.

Diameter D2 of the needle-shaped member means, in a cross section corresponding to a bottom surface of a pyramidal distal end portion of the needle-shaped member, a length of a line segment that passes through a center of the cross section (an axial center of the needle-shaped member) and has a minimum distance between the center and at least one end of the line segment among any line segments crossing the cross section. When a shape of the cross section is a regular polygon, it can be said that diameter D2 corresponds to a height dimension when any side of the regular polygon is a base. When the shape of the cross section is a regular square, diameter D2 corresponds to a length of one side of the regular square. When the cross section is a regular polygon, the center of the cross section is a center of a circumscribed circle of the regular polygon.

In the second C step, portion P2 led out to the second principal surface of the lead member together with portion P1 protruding from the second principal surface of the electrode foil is folded back onto the second principal surface, and the folded parts of portion P1 and portion P2 are tightened to the second principal surface. The caulking part is formed by the second C step. In the second C step, the overlapping part between the electrode foil and the lead member is pressed in a thickness direction of the electrode foil and the lead member. Hereinafter, portion P1 and portion P2 are also referred to as a "protrusion" and a "led part", respectively. The folded parts of portion P1 and portion P2 are also referred to as a "first folded part" and a "second folded part", respectively.

In the second C step, portion P2 is folded back to cover the folded part of portion P1 on the second principal surface. In this case, when the caulking part is formed in the second C step (when the overlapping part is pressed), the first folded part is pressed in a state of being wrapped by the second folded part on the second principal surface. Thus, the first folded part and the second folded part firmly adhere to each other, and a region where the first folded part and the second folded part adhere to each other is also sufficiently secured. As a result, contact resistance between the lead member and the electrode foil is reduced. The connection strength between the lead member and the electrode foil is also improved, and low contact resistance is maintained even when a load is applied to the connecting part (caulking part) between the lead member and the electrode foil.

In the second A step, region A where the metal base of the electrode foil is exposed is formed on an inner wall surface of the preliminary through-hole of the electrode foil along with the formation of the preliminary through-hole. In the second B step, along with the formation of the protrusion, region B which is derived from region A and from which the metal base of the electrode foil is exposed is formed on an upper end face of the protrusion. In the second C step, along with the formation and pressing of the first folded part and the second folded part, region C which is derived from region B and from which the metal base of the electrode foil is exposed is formed on a surface of the first folded part covered with the second folded part (surface opposite to the second principal surface). Region C is formed around a distal end of the first folded part, and is formed firmly adhere to the second folded part. Since region A is stretched to the second principal surface side when the protrusion is formed, and region B is pushed and widened when the first folded part is formed, region C is easily secured to be large. Region C and the second folded part are easily brought into planar contact, and a metal bond may be generated between region C (first metal) and the second folded part. As a result, contact resistance between the lead member and the electrode foil can be reduced.

Region C can be sufficiently formed even when region A is small, and an effect of reducing the contact resistance can be remarkably obtained in the case of a cathode foil having a small thickness. A thickness of the cathode foil ranges, for example, from 20 μm to 60 inclusive.

When the second folded part is formed not to cover the first folded part, the first folded part is less likely to be fixed by the second folded part when the folded part is pressed, and is likely to be deviated in a direction protruding from the second folded part on the second principal surface. Thus, adhesiveness between the first folded part (region C) and the second folded part is not sufficiently secured, and the adhering region is also reduced. Region C may not be covered with the second folded part.

When the preliminary through-hole is not provided in the second A step, the first folded part is less likely to be covered by the second folded part, and region C may not be covered with the second folded part.

When $1 \leq D1/D2$, in the second B step, the periphery of the preliminary through-hole is less likely to be led out, the protrusion (region B) is less likely to be formed, and the first folded part firmly adhering to the second folded part is less likely to be formed. Thus, the strength of the connecting part (caulking part) between the lead member and the electrode foil may decrease, and the contact resistance may increase when a load is applied to the connecting part. The protrusion (region B) is hardly formed, and in the second B step, the penetrating part of the lead part is formed to cover an inner wall surface of the preliminary through-hole, and in the second C step, the overlapping part is pressed in a state where the penetrating part of the lead part covers the inner wall surface of the preliminary through-hole. In this case, adhesiveness between region A and the penetrating part is low (the adhesion region is small), and the contact between the metal base of the electrode foil and the lead member may be insufficient in the caulking part.

Height H1 (maximum height) from the second principal surface of portion P1 before being folded back onto the second principal surface is preferably smaller than height H2 (maximum height) from the second principal surface of portion P2 before being folded back onto the second principal surface. H1/H2 may be greater than 0 and less than 1, may range from 0.1 to 0.9, inclusive, or may range from 0.2 (or from 0.4) to 0.8, inclusive. In this case, in the second C step, the second folded part enclosing the first folded part is easily formed.

Diameter D1 (mm) of the preliminary through-hole, diameter D2 (mm) of the needle-shaped member, and thickness T (mm) of the lead member (tab part) preferably satisfy the relationship of the following Expression (1).

$$0 < (D2-D1)/T \leq \tfrac{1}{2} \qquad (1)$$

When Expression (1) is satisfied, height H1 can be easily adjusted to be smaller than height H2, and H1/H2 can be easily adjusted to fall within the above range. Length L1 can be easily adjusted to be smaller than length L2, and L1/L2 can be easily adjusted to fall within the above range. In the second C step, the second folded part enclosing the first folded part is easily formed.

Figure 5:
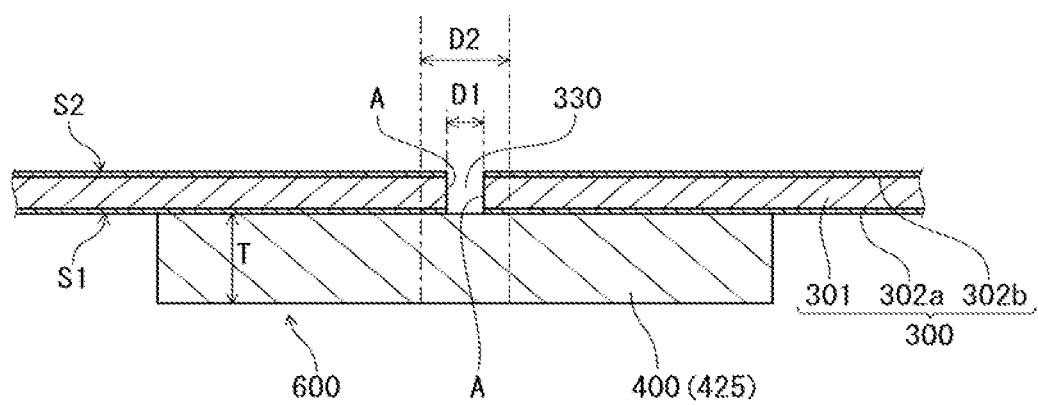
FIG. 5 is a sectional view schematically illustrating main parts of the electrode foil and the lead member after a second A step (before drilling) in the method for manufacturing an electrolytic capacitor according to the exemplary embodiment of the present disclosure.
Figure 6:
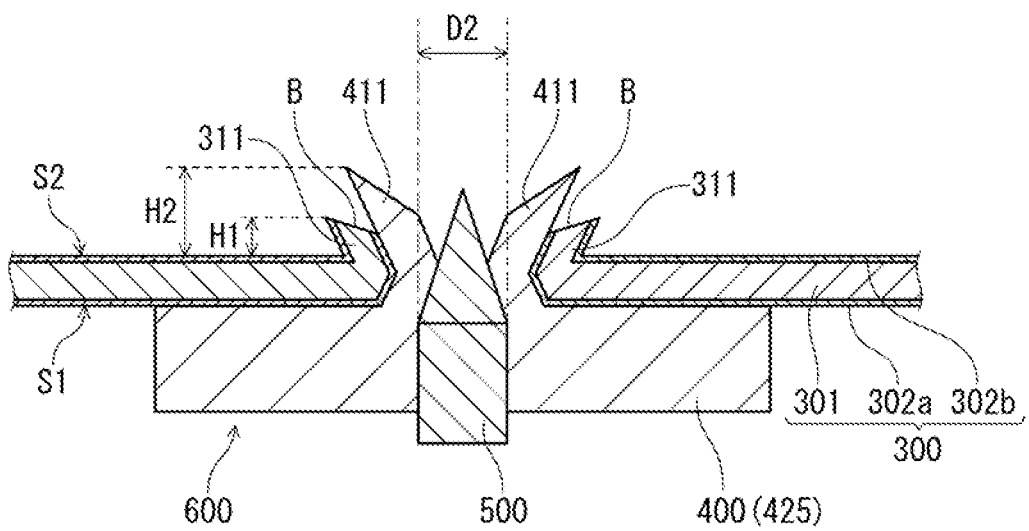
FIG. 6 is a sectional view schematically illustrating main parts of the electrode foil and the lead member after a second B step (after drilling) in the method for manufacturing an electrolytic capacitor according to the exemplary embodiment of the present disclosure.

Hereinafter, an example of a second step in a method for manufacturing an electrolytic capacitor according to the exemplary embodiment of the present disclosure will be described. FIG. 5 is a sectional view schematically illustrating main parts of the electrode foil and the lead member after a second A step. FIG. 6 is a sectional view schematically illustrating main parts of the electrode foil and the lead member after a second B step. FIG. 4 is a sectional view schematically illustrating main parts of the electrode foil and the lead member after the second C step.

(Second A Step)

A cylindrical preliminary through-hole 330 is provided in electrode foil 300 by using a predetermined jig such as a punch. Electrode foil 300 has region A where the metal structure of metal foil 301 is exposed on an inner wall surface of preliminary through-hole 330. When electrode foil 300 is viewed from the normal direction of the principal surface, preliminary through-hole 330 has a circular shape. The shape of the preliminary through-hole is not limited thereto, and may be a polygon or a star polygon. When the shape of the preliminary through-hole is a (star) regular polygon, a center of the preliminary through-hole is a center of a circumscribed circle of the (star) regular polygon.

Overlapping part 600 between electrode foil 300 and lead member 400 is formed by overlapping lead member 400 in a predetermined region including preliminary through-hole 330 on first principal surface S1 of electrode foil 300.

(Second B Step)

A predetermined position of overlapping part 600 is drilled by using needle-shaped member 500. Specifically, in overlapping part 600, needle-shaped member 500 is pierced from lead member 400 side to a position of lead member 400 corresponding to preliminary through-hole 330. Through-hole 711 penetrating both electrode foil 300 and lead member 400 is formed at a location drilled by needle-shaped member 500.

With formation of the through-hole 711, a part of lead member 400 is led out to second principal surface S2 and a part of electrode foil 300 protrudes from second principal surface S2 around through-hole 711. That is, with the formation of through-hole 711, a part of lead member 400 is led out to second principal surface S2 of electrode foil 300 to form led part 411. Needle-shaped member 500 passes through preliminary through-hole 330, and thus, preliminary through-hole 330 is pushed and widened. At this time, a peripheral edge portion of preliminary through-hole 330 of electrode foil 300 protrudes from second principal surface S2 of electrode foil 300 to form protrusion 311.

A distal end shape of needle-shaped member 500 is a quadrangular pyramid shape, and a cross section of the distal end shape is a quadrangle. Electrode foil 300 (around preliminary through-hole 330) and lead member 400 are pierced along a corner of the cross section of the distal end of needle-shaped member 500. Protrusion 311 and led part 411 protruding from second principal surface S2 along with drilling by needle-shaped member 500 have a shape pushed and widened in a petal shape in four directions. The distal end shape of the needle-shaped member is not limited thereto, and may be a pyramid shape other than the quadrangular pyramid shape. In this case, the shapes of the through-hole and the protrusion (led part) may be different from the shapes in the examples of FIGS. 1 and 2.

As illustrated in FIGS. 5 and 6, diameter D1 of the preliminary through-hole corresponding to diameter D2 of needle-shaped member 500 when needle-shaped member 500 is allowed to pass through preliminary through-hole 330 is smaller than diameter D2 of needle-shaped member 500. Diameter D2 of needle-shaped member 500 corresponds to a length of one side of a quadrangle in a cross section corresponding to a bottom surface of a distal end portion of the quadrangular pyramid shape, and can also be said to correspond to a length of through-hole 711 in an X-X direction in FIG. 3. An end face of protrusion 311 has region B which is derived from region A and from which the metal structure of metal foil 301 is exposed.

It is preferable that diameter D1 (mm) of preliminary through-hole 330, diameter D2 (mm) of needle-shaped member 500, and thickness T (mm) of lead member 400 (tab part 425) illustrated in FIG. 5 satisfy a relationship of the above Expression (1). When Expression (1) is satisfied, H1 and H2 in FIG. 6 are easily adjusted such that H1/H2 is less than 1 (or less than or equal to 0.9). L1 and L2 in FIG. 4 are easily adjusted such that L1/L2 is less than 1 (or less than or equal to 0.9). In FIG. 5, H1 represents a maximum height of protrusion 311 from the second principal surface, and H2 represents a maximum height of led part 411 from the second principal surface. In FIG. 5, the heights of the protrusion and the led part become maximum in the same cross section of the overlapping part, but may become maximum in different cross sections of the overlapping part.

(Second C Step)

Caulking part 710 is formed by pressing overlapping part 600 in which protrusion 311 and led part 411 are formed. Overlapping part 600 is pressed, for example, at a pressure of 8 MPa to 12 MPa. A pressing time is not particularly limited, and is, for example, about 0.3 seconds to 1 second. By pressing overlapping part 600, led part 411 is folded back onto the second principal surface together with protrusion 311, and first folded part 312 and second folded part 412 are formed. Overlapping part 600 (first folded part 312 and second folded part 412) is pressed, and first folded part 312 and second folded part 412 are tightened to the second principal surface.

led part 411 is folded back to cover first folded part 312 on second principal surface S2. That is, second folded part 412 enclosing first folded part 312 is formed in caulking part 710. A surface of first folded part 312 covered with second folded part 412 (surface opposite to second principal surface S2) has region C which is derived from region B and from which the metal structure of metal foil 301 is exposed.

Overlapping part 600 is pressed in the thickness direction of electrode foil 300, and through-hole 711 and electrode foil 300 and lead member 400 around through-hole 711 are deformed together with protrusion 311 and led part 411. Due to the deformation of protrusion 311 and led part 411, caulking piece 712 having first folded part 312 and second folded part 412 is formed on the outer periphery of through-hole 711. Caulking piece 712 is formed in a petal shape in four directions from through-hole 711. Electrode foil 300 is strongly pressed against caulking piece 712 and is pressure-bonded to lead member 400. By this pressure-bonding, electrode foil 300 and lead member 400 are electrically connected to each other.

Figure 7:
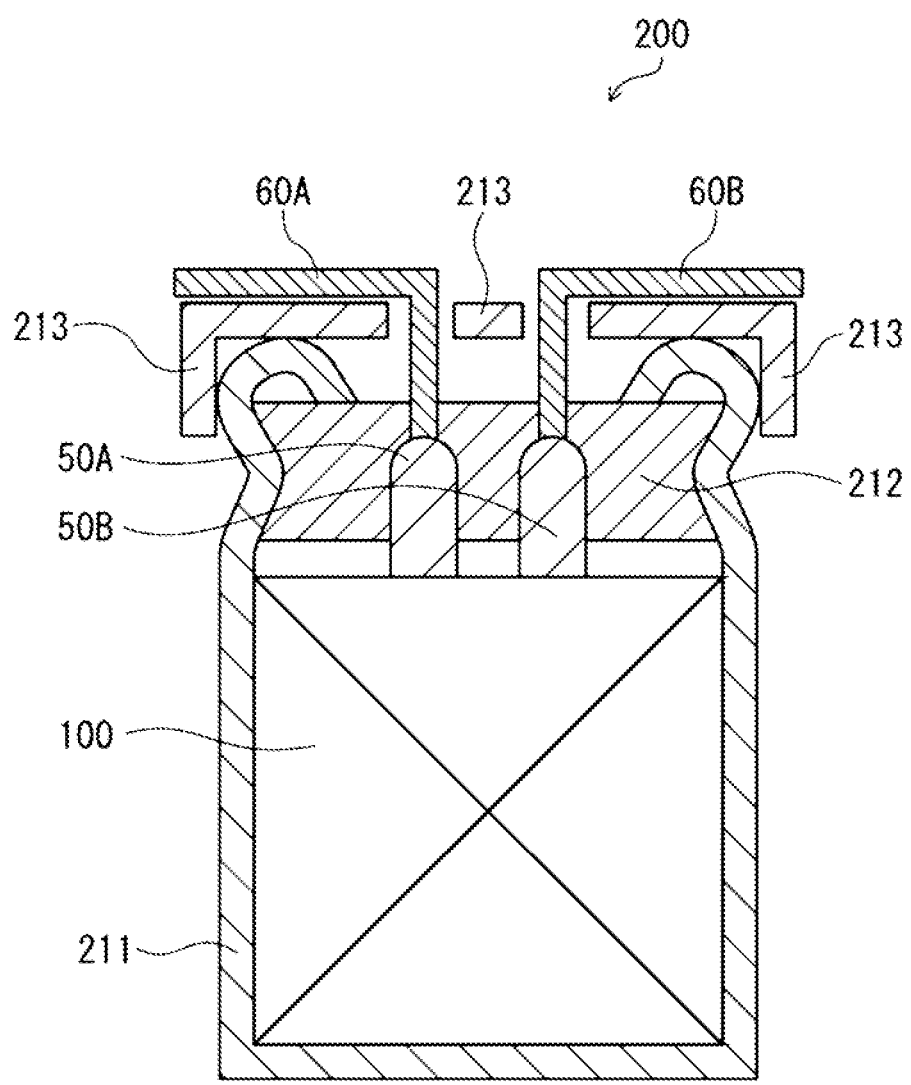
FIG. 7 is a sectional view schematically illustrating the electrolytic capacitor according to the exemplary embodiment of the present disclosure.
Figure 8:
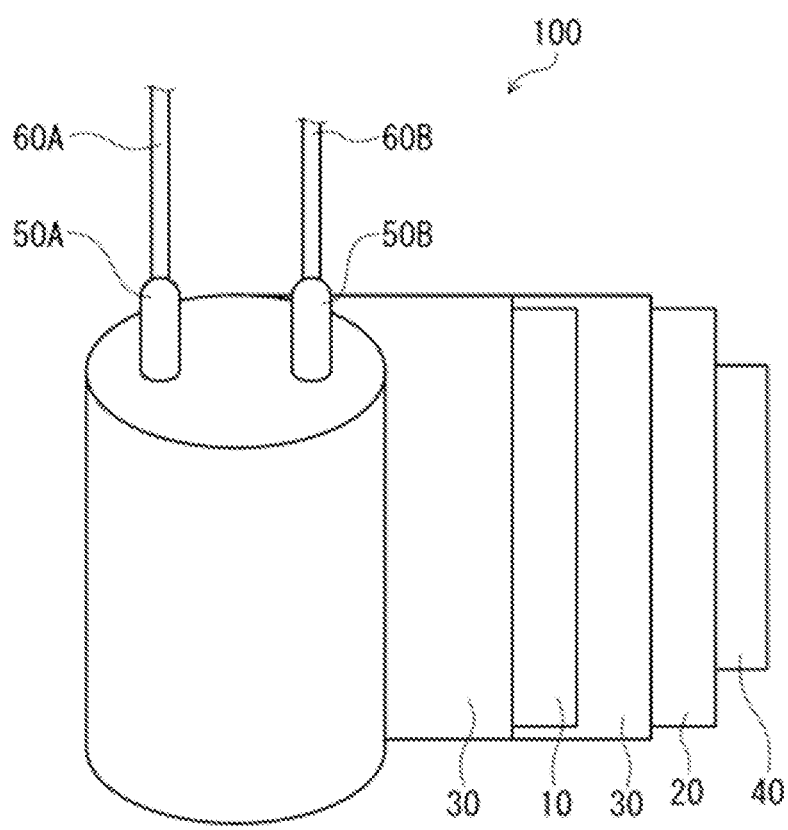
FIG. 8 is a perspective view schematically illustrating a configuration of a wound body included in the electrolytic capacitor according to the exemplary embodiment of the present disclosure.

Here, FIG. 7 is a sectional view schematically illustrating the electrolytic capacitor according to the exemplary embodiment of the present disclosure. FIG. 7 illustrates an example of an electrolytic capacitor including a wound-type capacitor element. FIG. 8 is a perspective view schematically illustrating a configuration of a wound body of FIG. 7.

Electrolytic capacitor 200 includes wound body 100. Wound body 100 is formed by winding anode foil 10 and cathode foil 20 with separator 30 interposed therebetween.

End portions on one side of lead tabs 50A and 50B are connected to anode foil 10 and cathode foil 20, respectively, and wound body 100 is formed while lead tabs 50A and 50B are wound. Lead wires 60A and 60B are connected to end portions on the other side of lead tabs 50A and 50B, respectively.

Connection between anode foil 10 and lead tab 50A and/or connection between cathode foil 20 and lead tab 50B are performed by the method for manufacturing an electrolytic capacitor according to the present disclosure (second step). In particular, since cathode foil 20 has a small thickness, an effect of reducing the contact resistance between the cathode foil and lead tab 50B by using the manufacturing method can be remarkably obtained.

Winding stop tape 40 is arranged on an outer surface of cathode foil 20 positioned at an outermost layer of wound body 100, and an end portion of cathode foil 20 is fixed by winding stop tape 40. When anode foil 10 is prepared by cutting a large foil, an anodizing treatment may further be performed on wound body 100 in order to provide a dielectric layer on a cut surface.

Wound body 100 contains an electrolyte, and the electrolyte is interposed between anode foil 10 (dielectric layer) and the cathode foil. Wound body 100 containing the electrolyte is formed, for example, by impregnating wound body 100 with a treatment solution containing a conductive polymer. The impregnation may be performed under a reduced pressure, for example, in an atmosphere of 10 kPa to 100 kPa. An electrolytic solution may be contained in wound body 100.

Wound body 100 is housed in bottomed case 211 such that lead wires 60A and 60B are positioned on an opening side of bottomed case 211. As a material of bottomed case 211, a metal such as aluminum, stainless steel, copper, iron, or brass, or an alloy thereof can be used.

Sealing member 212 is arranged at an opening portion of bottomed case 211 in which wound body 100 is housed, an opening end of bottomed case 211 is caulked to sealing member 212 to be curled, and base plate 213 is disposed at a curled portion. Thus, wound body 100 is sealed in bottomed case 211. Separator 30 is not particularly limited. For example, an unwoven fabric including fibers of cellulose, polyethylene terephthalate, vinylon, or polyamide (for example, aliphatic polyamide or aromatic polyamide such as aramid).

Sealing member 212 is formed such that lead wires 60A and 60B penetrate therethrough. Sealing member 212 may be an insulating substance, and is preferably an elastic body. Among these materials, silicone rubber, fluororubber, ethylene propylene rubber, Hypalon rubber, butyl rubber, isoprene rubber, and the like, having high heat resistance, are preferable.

The electrolyte contains at least one of a solid electrolyte and an electrolytic solution. The electrolytic solution contains a non-aqueous solvent and a solute (for example, an organic salt) dissolved in the non-aqueous solvent. The non-aqueous solvent may be used together with the solid electrolyte. The solid electrolyte contains a conductive polymer such as polythiophene. The solid electrolyte may contain a dopant such as polystyrenesulfonic acid together with the conductive polymer.

EXAMPLES

Hereinafter, the present disclosure will be described in more detail based on examples, but the present disclosure is not limited to the examples.

Example 1

The caulking part illustrated in FIGS. 1 to 4 was formed, and the cathode foil and the lead member were connected.

As the electrode foil, a cathode foil in which a titanium nitride layer (thickness: 1 μm) was formed on both surfaces of an aluminum foil (plane foil) having a thickness of 28 μm was prepared. The cathode foil was cut into a strip shape having a length of 300 mm and a width of 10 mm. Four cylindrical preliminary through-holes (diameter D1: 0.5 mm) were provided at predetermined positions of the cathode foil by using a predetermined punch. The four preliminary through-holes were provided at regular intervals along a width direction of the cathode foil. The lead member (thickness T: 0.3 mm) was overlaid on the cathode foil at a position where the preliminary through-hole was provided to form the overlapping part. Drilling was performed at a position of the overlapping part corresponding to the preliminary through-hole by using the needle-shaped member (diameter D2: 0.6 mm) of which the distal end shape is the quadrangular pyramid shape. Drilling was performed from the lead member side. Subsequently, pressing was performed to connect the cathode foil and the lead member by four caulking parts. As stated above, sample A in which the lead member and the electrode foil were connected was obtained. In sample A, the second folded part enclosing the first folded part was formed. L1/L2 was a value represented in Table 1.

[Evaluation 1: Measurement of Contact Resistance]

The contact resistance between the cathode foil and the lead member was measured by a four-terminal method. Fifteen samples A were prepared, and an average value of contact resistances of fifteen samples A was obtained.

[Evaluation 2: Measurement of Contact Resistance after Load]

The cathode foil was fixed, and a load of 100 gf was applied in a direction parallel to a length direction of the cathode foil from a side end face at a location close to the overlapping part of the lead member (position at a distance of 2 mm from the end portion of the overlapping part). A time during which the load was applied is 3 seconds. Thereafter, the contact resistance after the load was measured in the same manner as in Evaluation 1. Ten samples A were prepared, and an average value of contact resistances of ten samples A after the load was obtained.

Comparative Example 1

Sample B1 was obtained and evaluated in the same manner as in Example 1 except that the preliminary through-hole was not provided in the cathode foil. In sample B1, the first folded part was not covered by the second folded part.

Comparative Example 2

Sample B2 was obtained and evaluated in the same manner as in Example 1 except that diameter D1 of the preliminary through-hole was set to 0.7 mm. In sample B2, the first folded part was hardly formed.

Evaluation results are represented in Table 1. The contact resistance in Table 1 is represented as a relative value when the contact resistance of sample B1 obtained in Evaluation 1 is 100.

TABLE 1

| | Diameter D1 of preliminary through-hole (mm) | Diameter D2 of needle-shaped member (mm) | Thickness T of lead member (mm) | D1/D2 | (D2 − D1)/T | L1/L2 | Contact resistance (index) | Contact resistance after load (index) |
|---|---|---|---|---|---|---|---|---|
| A | 0.5 | 0.6 | 0.3 | 0.83 | 0.33 | 0.7 | 70 | 80 |
| B1 | — | 0.6 | 0.3 | — | — | 1.2 | 100 | 130 |
| B2 | 0.7 | 0.6 | 0.3 | 1.17 | −0.33 | — | 60 | 100 |

In sample A, the contact resistance was reduced, the connection strength was high, and the contact resistance after the load was also suppressed to be small. In sample B1, the contact resistance was high, the connection strength was low, and the contact resistance after the load also increased. In sample B2, the connection strength was low, and the contact resistance after the load increased.

The method for manufacturing an electrolytic capacitor according to the present disclosure can be suitably used for manufacturing an electrolytic capacitor having a small contact resistance between a lead member and an electrode foil.

What is claimed is:

1. An electrolytic capacitor comprising:
   a cathode foil having a first principal surface and a second principal surface opposite to the first principal surface; and
   a lead member connected to the cathode foil, wherein:
   the cathode foil includes a metal foil and a coating layer that covers both principal surfaces of the metal foil,
   the metal foil includes a first metal,
   the coating layer includes at least one selected from the group consisting of an oxide layer of a second metal, a nitride layer of the second metal, a carbide layer of the second metal, and a conductive layer, the second metal being different from the first metal,
   a thickness of the cathode foil ranges from 20 μm to 60 μm, inclusive,
   a thickness of the coating layer ranges from 0.1 μm to 5 μm, inclusive,
   the cathode foil and the lead member are connected by a caulking part in an overlapping part in which the first principal surface of the cathode foil and the lead member overlap each other,
   the caulking part has a through-hole penetrating the cathode foil and the lead member,
   the cathode foil in the caulking part includes a first folded part that is folded back at a peripheral edge portion of the through-hole to be disposed on the second principal surface,
   the lead member in the caulking part includes (i) a penetrating part that penetrates the cathode foil and (ii) a second folded part that is folded back at an end portion of the penetrating part to be disposed on the second principal surface, the penetrating part including an inner wall of the through-hole,
   the second folded part covers the first folded part,
   in a cross section of the caulking part that is cut at a plane parallel to a thickness direction of the cathode foil, a length L1 from a center of the through-hole to an edge of the first folded part in a plane direction of the cathode foil is smaller than a length L2 from the center of the through-hole to an edge of the second folded part in the plane direction of the cathode foil, and
   a ratio L1/L2 of the length L1 to the length L2 is less than or equal to 0.9.

2. The electrolytic capacitor according to claim 1, wherein the first folded part has a region where a metal structure of the metal foil is exposed in a surface covered with the second folded part.

3. The electrolytic capacitor according to claim 1, wherein the first metal includes at least one selected from the group consisting of aluminum, tantalum, and niobium.

4. The electrolytic capacitor according to claim 1, wherein the second metal includes at least one selected from the group consisting of titanium, nickel, tantalum, and niobium.

5. The electrolytic capacitor according to claim 1, wherein the conductive layer includes a carbon layer.

6. The electrolytic capacitor according to claim 1, wherein a thickness of the cathode foil exposed from the lead member is greater than a largest thickness of the cathode foil covered by the lead member.

* * * * *